(12) United States Patent
Jiang

(10) Patent No.: US 9,697,053 B2
(45) Date of Patent: Jul. 4, 2017

(54) SYSTEM AND METHOD FOR MANAGING EXCESSIVE DISTRIBUTION OF MEMORY

(71) Applicant: ZTE Corporation, Shenzhen, Guangdong (CN)

(72) Inventor: Kunpeng Jiang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/774,690

(22) PCT Filed: Mar. 14, 2014

(86) PCT No.: PCT/CN2014/073481
§ 371 (c)(1),
(2) Date: Sep. 10, 2015

(87) PCT Pub. No.: WO2014/139470
PCT Pub. Date: Sep. 18, 2014

(65) Prior Publication Data
US 2016/0026506 A1   Jan. 28, 2016

(30) Foreign Application Priority Data
Mar. 15, 2013   (CN) .......................... 2013 1 0084341

(51) Int. Cl.
*G06F 9/50* (2006.01)
*G06F 9/48* (2006.01)

(52) U.S. Cl.
CPC .......... *G06F 9/5088* (2013.01); *G06F 9/4856* (2013.01); *G06F 9/5016* (2013.01);
(Continued)

(58) Field of Classification Search
None
See application file for complete search history.

(56) References Cited

U.S. PATENT DOCUMENTS

| 8,370,560 B2 | 2/2013 | Dow et al. |
| 8,635,396 B2 | 1/2014 | Dow et al. |

(Continued)

FOREIGN PATENT DOCUMENTS

| CN | 101697134 A | 4/2010 |
| CN | 102103524 A | 6/2011 |

(Continued)

OTHER PUBLICATIONS

Supplementary European Search Report in European application No. 14763336.6, mailed on Feb. 9, 2016.
International Search Report in international application No. PCT/CN2014/073481, mailed on Jun. 30, 2014.
(Continued)

*Primary Examiner* — Eric C Wai
(74) *Attorney, Agent, or Firm* — Oppedahl Patent Law Firm LLC

(57) ABSTRACT

Disclosed are a system and a method for managing excessive distribution of memory. Based on a page sharing technology, the software types of virtual machines running in respective servers in a cluster are collected, and the virtual machines with similar running software types are migrated from a server to a specified server, so that the page sharing effect of the virtual machines and the excessive distribution effect of memory are better, the bearing capability of the servers in the system is ensured not to be wasted, the utilization rates of memory and resources of the whole system are combined optimally, and the memory of the whole cluster system is distributed better; moreover, a fewer number of servers run, the energy and the running cost are saved, less pressure is caused to the environment, the emission of carbon dioxide is reduced, therefore, the disclosure has a great social effect and economic effect.

13 Claims, 7 Drawing Sheets

(52) U.S. Cl.
CPC .......... *G06F 9/5033* (2013.01); *Y02B 60/142* (2013.01); *Y02B 60/162* (2013.01)

(56) References Cited

U.S. PATENT DOCUMENTS

| | | |
|---|---|---|
| 2009/0070771 A1 | 3/2009 | Yuyitung |
| 2010/0063785 A1* | 3/2010 | Pich ................ G06K 9/6251 703/6 |
| 2011/0119427 A1 | 5/2011 | Dow |
| 2011/0214122 A1* | 9/2011 | Lublin ............. G06F 9/5033 718/1 |
| 2011/0302577 A1 | 12/2011 | Reuther |
| 2013/0060988 A1 | 3/2013 | Dow et al. |
| 2014/0047444 A1 | 2/2014 | Yamaguchi |
| 2014/0114933 A1* | 4/2014 | Chandrasekarasastry ................ G06F 12/02 707/692 |
| 2015/0170260 A1* | 6/2015 | Lees ............. G06Q 30/0643 705/27.2 |

FOREIGN PATENT DOCUMENTS

| | | |
|---|---|---|
| CN | 102236582 A | 11/2011 |
| WO | 2009026703 A1 | 3/2009 |
| WO | 2011057874 A2 | 5/2011 |
| WO | 2012144647 A1 | 10/2012 |

OTHER PUBLICATIONS

English Translation of the Written Opinion of the International Search Authority in international application No. PCT/CN2014/073481, mailed on Jun. 30, 2014.

\* cited by examiner

SYSTEM AND METHOD FOR MANAGING EXCESSIVE DISTRIBUTION OF MEMORY

TECHNICAL FIELD

The disclosure relates to the technical field of computer virtualization, and more particularly to a system and a method for managing the excessive distribution of memory.

BACKGROUND

With the development of cloud computing, the computer virtualization technology, as one of the basic technologies of the cloud computing, is also developing gradually, and can share a Central Processing Unit (CPU), a hard disk, a memory and other resources by operating a plurality of virtual machines on one server, which thus saves the hardware investment of an enterprise on a computer and is one of the evolution directions of the virtualization technology.

The excessive distribution of memory is a memory distribution technology, by which virtual memory can be distributed to a plurality of virtual machines in a server, and the sum of memory that respective virtual machines are aware of exceeds the actual amount of physical memory of the server. According to different implementation mechanisms, the main technologies for excessive distribution of memory are as follows:

a balloon driving technology: by this technology, the memory that each virtual machine is aware of is more than the memory actually distributed; a balloon driver is utilized on the virtual machine to occupy the excessively-distributed memory to prevent the excessively-distributed memory from not being distributed to other programs in the virtual machine; and when the memory of the programs of the virtual machine is insufficient, a virtual machine operating system may start a memory page switch mechanism in the range of the virtual machine automatically;

a virtual machine manager page switch technology: after the memory page of the virtual machine is distributed completely, a virtual machine manager saves part of memory pages to a disk, so as to release some memory for the virtual machine to utilize, to make a virtual machine user not be aware of the excessive distribution of the memory; and a page sharing technology: based on a page, the pages with same content in different virtual machines are mapped to a same physical page.

In the technologies above, the probability of insufficiency of memory is high in the balloon driving technology, so the experience of the virtual machine user is very poor; while in the virtual machine manager page switch technology, the virtual machine user may not be aware of the insufficiency of memory, so the experience of the virtual machine user is better in comparison with the balloon driving technology, whereas, in an actual running process, the running performance of the virtual machine manager page switch technology is poorer than that in the balloon driving technology, so the efficiency and accuracy achieved by utilizing a virtual machine manager for page switch are lower than that achieved by utilizing a virtual machine operating system for page switch, therefore, the page sharing technology becomes the best one in the technologies above, this is because the memory distributed by the page sharing technology is that actually existing, and such problems as performance reduction and poor user experience are avoided.

At present, the transparent page sharing function provided by the VMware company and the kernel same page combining function provided by the Linux kernel company both are page sharing technology. The page sharing technology has many advantages but also has the following defects: its sharing effect highly depends on the similarity of running software of the virtual machines, namely, the higher the similarity of running software of two virtual machines is, the more pages they can share, and the better the effect of excessive distribution of memory is; on the contrary, the lower the similarity of running software of two virtual machines is, the fewer pages they can share, and the poorer the effect of excessive distribution of memory is. Therefore, for a large server cluster system, if the similarity of software of virtual machines on each server is not high, the effect of excessive distribution of memory of the whole cluster system is poor, so that memory resources are wasted and a fewer number of virtual machines run in the system.

SUMMARY

Embodiments of the disclosure mainly provide a system and a method for managing excessive distribution of memory, in order to migrate virtual machines with similar running software types from a server to a specified server according to the collected software types of virtual machines running in each server in a cluster, and enable the memory in the whole cluster system to be distributed better.

An embodiment of the disclosure provides a system for managing excessive distribution of memory, including:

a cluster management module, which is configured to send an information collection instruction, collect software type information of virtual machines running in respective servers in a cluster, enable the respective servers to form a tree structure after classifying the respective servers according to the software type information of the virtual machines and dynamically identifying types of the respective servers, and deploy the tree structure after sending a migration instruction; and a server management module, which is connected with the cluster management module and is configured to collect type information of running software in each of the virtual machines in the respective servers and report the type information to the cluster management module after receiving the information collection instruction from the cluster management module, and migrate virtual machines with similar running software types from local servers to a specified server after receiving the migration instruction from the cluster management module.

Preferably, the server management module may include an information collecting module and a migrating module, wherein the information collecting module is configured to collect the type information of the running software in each of the virtual machines in the respective servers and report the type information to the cluster management module after receiving the information collection instruction from the cluster management module; and the migrating module is configured to migrate the virtual machines with similar running software types from the local servers to the specified server after receiving the migration instruction from the cluster management module.

Preferably, the cluster management module may include a virtual machine creating module, which is configured to judge whether there is a server which is similar to configuration information of a virtual machine to be created when creating the virtual machine;

if such a server exists, select the server which is similar to the configuration information of the virtual machine to be created as a bearable server of the virtual machine and then create the virtual machine;

otherwise, select an idle server as the bearable server of the virtual machine and then create the virtual machine.

Preferably, the cluster management module may include a timing module, which is configured to send the information collection instruction to the server management module regularly according to a preset time interval; and the cluster management module is further configured to send the migration instruction according to regularly collected type information of the running software of the virtual machines in the respective servers collected regularly and deploy the tree structure formed by the respective servers.

Preferably, the migrating module may be further configured to return migration result information to the cluster management module.

Preferably, the software type information of the virtual machines may include operating system type information, operating system version information and running progress information.

Preferably, the tree structure may sequentially include four layers: un-typed servers, servers with a same operating system type, servers with a same operating system version and servers with a similar running progress.

Preferably, a communication channel between the cluster management module and the server management module may be one of a Local Area Network (LAN) channel, an Internet channel, a serial channel, a fibre channel, a wireless channel or a Storage Area Network (SAN) channel.

An embodiment of the disclosure provides a method for managing excessive distribution of memory, including:

an information collection instruction is received, software type information of running software of virtual machines in respective servers is collected, the respective servers are classified according to the collected software type information of the virtual machines running in the respective servers in a cluster and types of the respective servers are identified dynamically and the respective servers are enabled to form a tree structure; and a migration instruction is received, the tree structure is deployed, and virtual machines with similar running software types are migrated from a local server to a specified server.

Preferably, the method for managing excessive distribution of memory may further include: a virtual machine is created, and whether there is a server which is similar to configuration information of the virtual machine to be created is judged when the virtual machine is to be created;

if such a server exists, the server which is similar to the configuration information of the virtual machine is selected as a bearable server of the virtual machine, and then the virtual machine is created;

otherwise, an idle server is selected as the bearable server of the virtual machine, and then the virtual machine is created.

Preferably, before the information collection instruction is received, the method may further include: the information collection instruction is sent regularly according to a preset time interval; and before the migration instruction is received, the method may further include: the migration instruction is sent according to regularly collected type information of the running software in the virtual machines in respective servers.

Preferably, the method may further include that migration result information is returned after the migration instruction is received, the tree structure is deployed, and the virtual machines with similar running software types are migrated from the server to the specified server.

Preferably, the software type information of the virtual machines may include operating system type information; and whether respective ratios of similarity of operating system types of the virtual machines running in the respective servers exceed a specified threshold is judged;

if a ratio exceeds the specified threshold, a corresponding server is identified as a server of which the ratio of similarity of operating system types exceeds the specified threshold;

otherwise, the corresponding server is identified as un-typed server.

Preferably, the software type information of the virtual machines may further include operating system version information, and whether both the respective ratios of similarity of operating system types and respective ratios of similarity of operating system versions of the virtual machines running in respective servers exceed specified thresholds is judged;

if both the two kinds of ratios exceed the specified thresholds, a corresponding server is identified as a server of which the ratio of similarity of operating system versions exceeds the specified threshold;

otherwise, whether the ratio of similarity of operating system types of virtual machines running in the corresponding server exceeds the specified threshold is judged, and dynamic identification is carried out.

Preferably, the software type information of the virtual machines may further include running process information, and whether the respective ratios of similarity of operating system types, and the respective ratios of similarity of operating system versions and respective ratios of similarity of running processes of the virtual machines running in the respective servers all exceed specified thresholds is judged;

if the three kinds of ratios all exceed the specified thresholds, a corresponding server is identified as a server of which the ratio of similarity of running processes exceeds the specified threshold;

otherwise, whether the ratio of similarity of operating system types and the ratio of similarity of operating system versions of virtual machines running in the corresponding servers exceed the specified thresholds is judged, and dynamic identification is carried out.

In the embodiments of the disclosure, the excessive distribution of memory is managed by the system for managing excessive distribution of memory; and the method for managing excessive distribution of memory includes that an information collection instruction is received, the type information of running software of virtual machines in respective servers is collected, the respective servers are classified and the types of the respective servers are identified dynamically according to the collected software types of the virtual machines running in the respective servers in a cluster, and then a tree structure is formed from the respective servers; a migration instruction is received, the tree structure is deployed, and the virtual machines with similar running software types are migrated from a local server to a specified server. In the embodiments, based on a page sharing technology, the software types of the virtual machines running in the respective servers in the cluster are collected, and the virtual machines with similar running software types are migrated from the local server to the specified server, so that the page sharing effect of the virtual machines and the excessive distribution effect of memory are better, the bearing capability of the servers in the system is ensured to be not wasted, the utilization rates of memory and resources of the whole system are combined optimally, and the memory of the whole cluster system is distributed better; moreover, a fewer number of servers run, the energy and the running cost are saved, less pressure is caused to the environment, the emission of carbon dioxide is reduced, therefore, the disclosure has a great social effect and economic effect.

The implementation of aims, function features and advantages of the disclosure may be further described below in combination with the embodiments and the drawings.

DETAILED DESCRIPTION

The technical solution of the disclosure is further described below in combination with the drawings and the embodiments. It should be understood that the embodiments herein are only intended to explain the disclosure instead of limiting the disclosure.

Figure 1:
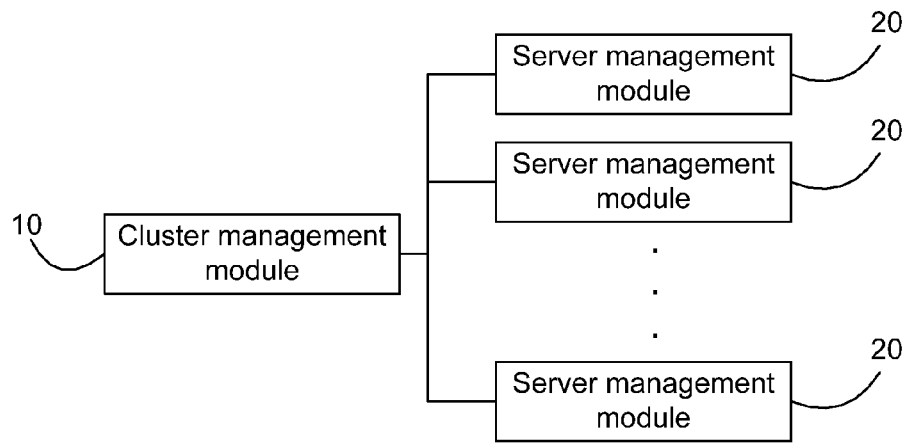
FIG. 1 is a schematic diagram showing the structure of a system for managing excessive distribution of memory in an embodiment of the disclosure.
Figure 2:
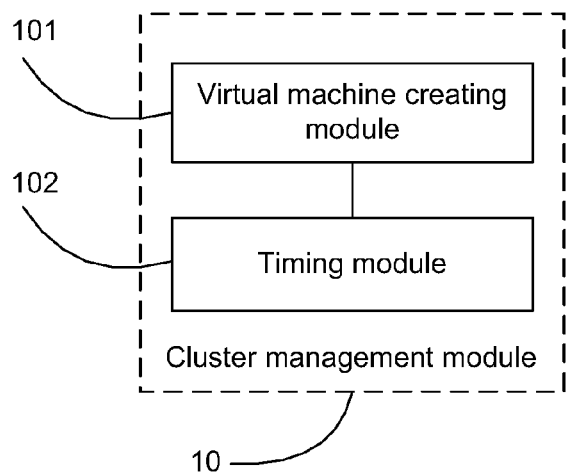
FIG. 2 is a schematic diagram showing the structure of a cluster management module in an embodiment of the disclosure.
Figure 3:
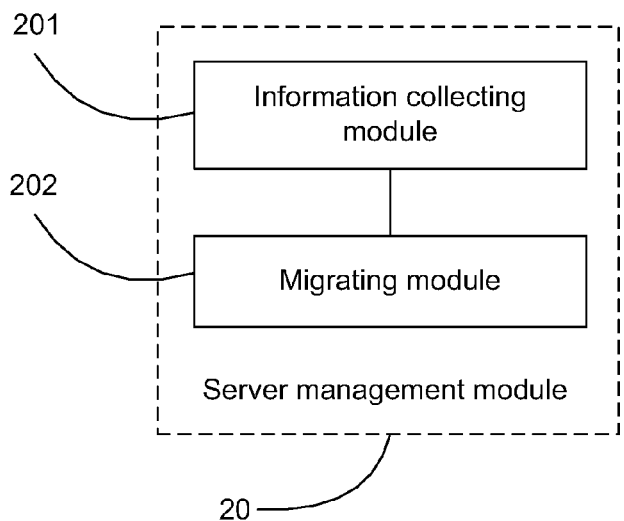
FIG. 3 is a schematic diagram showing the structure of a server management module in an embodiment of the disclosure.

See FIGS. 1 to 3, FIG. 1 is a schematic diagram showing the structure of a system for managing excessive distribution of memory in an embodiment of the disclosure; FIG. 2 is a schematic diagram showing the structure of a cluster management module in an embodiment of the disclosure; FIG. 3 is a schematic diagram showing the structure of a server management module in an embodiment of the disclosure; an embodiment of the disclosure provides a system for managing excessive distribution of memory, including:

a cluster management module 10, which is configured to send an information collection instruction, collect the software type information of virtual machines running in respective servers in a cluster, enable the respective servers to form a tree structure after classifying the respective servers according to the software types of the virtual machines and dynamically identifying the types of the respective servers, and deploy the tree structure after sending a migration instruction. Specifically, in the embodiment, the software type information of the virtual machines includes operating system type information, operation system version information and running progress information, but the embodiments of the disclosure are not limited to the software type information above only if the memory of the cluster system is distributed better. The cluster management module 10 runs in a cluster management server and is responsible for classifying respective servers in the cluster, and enabling all the servers in the system to form a tree structure according to type identifiers after the respective servers are classified according to the software types of the virtual machines running in the servers and the types of the respective servers are identified dynamically; moreover, it is also responsible for collecting the software type information of respective virtual machines in the system regularly, deploying and migrating the virtual machines of the similar software types to a specified same server as much as possible according to the collected information, and updating the dynamic identifiers of the respective servers according to the proportion of software types of the virtual machines running in the respective servers after the deploying is completed, so as to form a new tree structure, thereby facilitating the deployment of the virtual machines and the management of the servers and distributing the memory better. Moreover, the total spare capacity of the respective bearing servers in the system is ensured by migration not to exceed that of one server.

The server management module 20 is connected with the cluster management module 10 and is configured to collect the type information of running software in respective virtual machines in the servers and report the type information to the cluster management module 10 after receiving the information collection instruction from the cluster management module 10, and migrate the virtual machines with similar running software types from the local server to a specified server after receiving the migration instruction from the cluster management module 10. The server management module 20 runs on each server in the cluster, and is responsible for receiving the information collection instruction from the cluster management module, collecting the type information of running software of respective virtual machines in the server according to the received instruction, and reporting the type information to the cluster management module 10. Specifically, the server management module 20 includes an information collecting module 201 and a migrating module 202; the server management module 20 sends the information collection instruction to the information collecting module 201, and collects the type information of running software of respective virtual machines in the server through the information collecting module 201, such as the operating system type information, the operating system version information and the application software information of the running virtual machines; and then, the server management module 20 summarizes the collected information and reports the summarized information to the cluster management module 10. Moreover, the server management module 20 is further responsible for migrating the virtual machines in an on-line way, specifically, the server management module 20 sends the migration instruction to the migrating module 202, and the migrating module 202 migrates the running virtual machines with similar software types from the local server to the specified server.

According to the system for managing excessive distribution of memory, based on a page sharing technology, the software types of the virtual machines running in respective servers are collected, the running virtual machines with similar software types are migrated from the local server to the specified server, so that both the page sharing effect among the virtual machines and the excessive distribution effect of memory become better; moreover, the bearing capability of the servers in the system is ensured not to be wasted, the utilization rates of memory and resources of the whole system are combined optimally, and the memory of the whole cluster system is distributed better.

Figure 7:
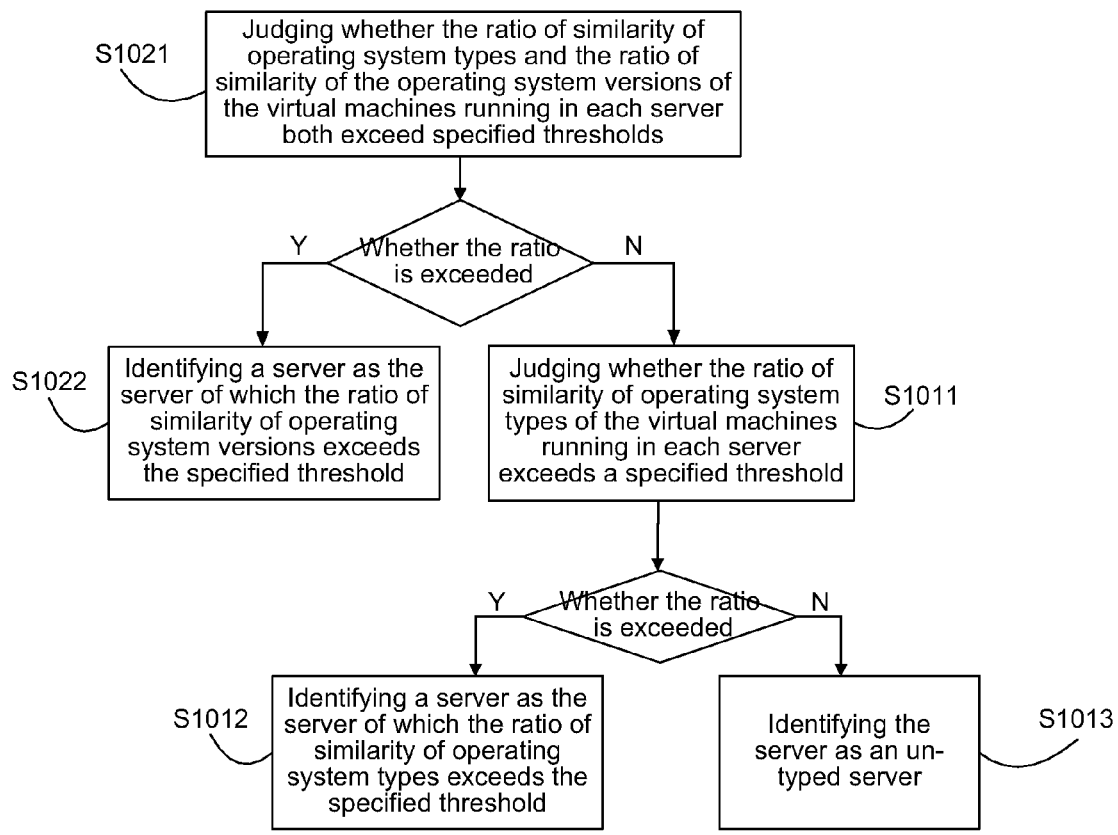
FIG. 7 is a schematic diagram showing the flow of dynamically identifying the type of a server in a second embodiment of the disclosure.

As shown in FIG. 2, the cluster management module 10 includes a virtual machine creating module 101. As shown in FIG. 7, which is a schematic diagram showing the flow of creating a virtual machine in an embodiment of the disclosure, the process of creating a virtual machine is not limited to be before or after a step in the method for managing excessive distribution of memory; when a virtual machine needs to be created, the cluster management module 10 is responsible for selecting a server which matches with the software type of the virtual machine to be created most; and the virtual machine creating module 101 is configured to judge whether there is a server similar to the configuration information of the virtual machine to be created when the virtual machine is to be created;

if such a server exists, after the server which is similar to the configuration information of the virtual machine to be created is selected as the bearable server of the virtual machine to be created, the virtual machine is created;

otherwise, after an idle server is selected as the bearable server of the virtual machine, the virtual machine is created.

Specifically, the cluster management module 10 creates a virtual machine according to an instruction; during the creation, firstly, whether there is a server similar to the configuration information of the virtual machine to be created is judged according to the static configuration information (such as operating system type information) of the virtual machine to be created, and a bearable server is selected on the tree structure formed by the servers according to the principle that the servers of similar types are prioritized; secondly, if no bearable server is found, an idle server is selected as the bearable server to create the virtual machine, the server management module 20 is started, and the selected bearable server is hooked to a root node of an un-typed layer 1; and finally, the virtual machine is started in the server.

As shown in FIG. 2, the cluster management module 10 further includes a timing module 102, which is configured to send an information collection instruction to the server management module regularly according to a preset time interval; and the cluster management module 10 is further configured to send a migration instruction according to the regularly collected type information of running software of the virtual machines in respective servers, and deploy the tree structure formed by the servers. The migrating module 202 is further configured to return migration result information to the cluster management module 10. Specifically, the timing module 102 of the cluster management module 10 regularly sends an information collection instruction to the server management module 20 running in each bearing server, and deploy the tree structure formed by the servers according to the information reported by the server management module 20 of each bearing server. In the deploying process, a virtual machine may need to be migrated among the respective bearing servers, the cluster management module 10 may send a migration instruction to the server management module 20 of the corresponding bearing server according to the regularly collected type information of running software in the virtual machines in respective servers and process the corresponding migration result information.

The communication channel between the cluster management module 10 and the server management module 20 is one of an LAN channel, an Internet channel, a serial channel, a fibre channel, a wireless channel or an SAN channel but is not limited to these channels. The communication channel between the server management module 20 and the Information collecting module 201 can also be one of an Internet Protocol (IP) channel and a sharing memory channel, but is not limited to the channels here.

Figure 4:
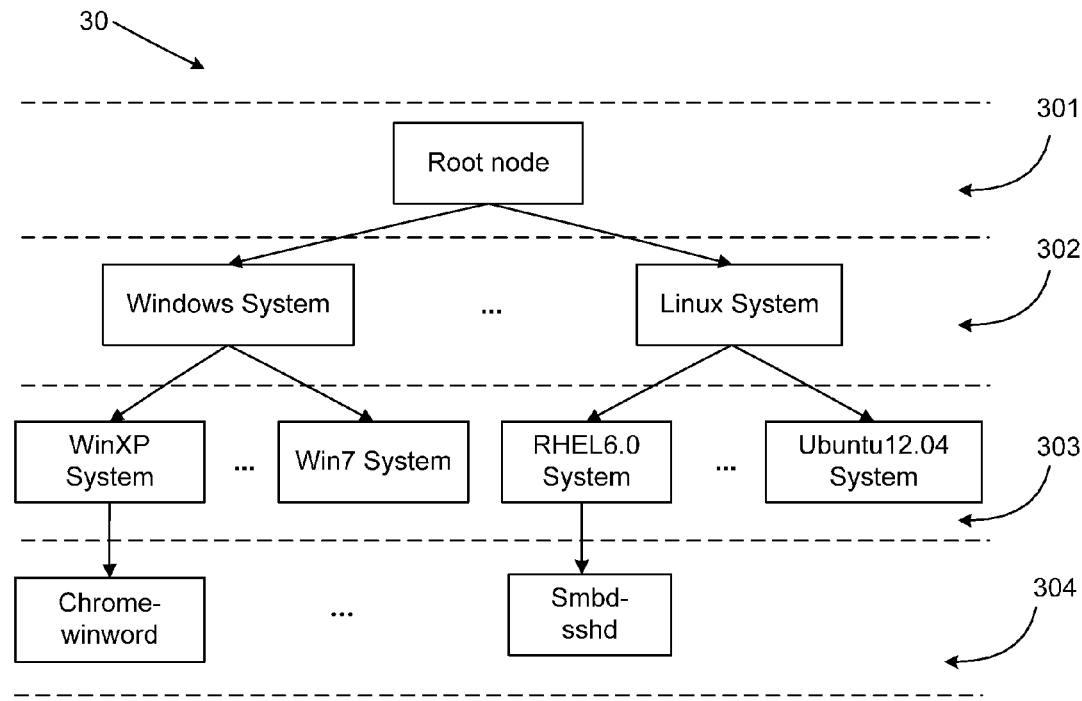
FIG. 4 is a schematic diagram showing the structure of a tree structure of a system for managing excessive distribution of memory in an embodiment of the disclosure.

Furthermore, as shown in FIG. 4, which is a schematic diagram showing the structure of a tree structure of a system for managing excessive distribution of memory in an embodiment of the disclosure, in the embodiment, the tree structure sequentially includes four layers: un-typed servers, servers with the same operating system type, servers with the same operating system version and servers with similar running progress, but the tree structure in the embodiment of the disclosure is not limited to the four layers only if the memory of the cluster system is distributed better; specifically, in the embodiment, the tree structure formed by the servers mainly includes four layers.

A node 301 on layer 1: this layer has only one node, i.e., a root node 301, which is hooked with an un-typed server and can be hooked with one or more servers which do not have a specific type. For example, when a system is started, respective servers cannot be classified specifically, so they are concentrated at the root node 301 till they can be transferred to the next layer; or, in the creation process of a virtual machine, if the servers at the root node 301 cannot bear the virtual machine to be created, the virtual machine may be created on an idle server and hooked with the root node 301. The root node 301 may be hooked with no server, namely, when all the servers bearing the virtual machines can be hooked with the layer node under the root node 301, the root node is not hooked with any server any more and is only for management, for example, it is used for search and other managements.

A node 302 on layer 2: nodes on this layer are mainly classified according to an operating system type but are not limited to the operating system type shown in FIG. 14 and may change as the change of the operating types of the respective virtual machines in a cluster system. The node 302 on layer 2 may have one or more nodes; as shown in FIG. 4, the nodes may include a Windows operating system type node, a Linux operating system type node and the like, and each node on this layer may or may not be hooked with a server. Specifically, when the respective servers cannot be specifically classified into the sub-nodes of the node 302 on layer 2, they may point to a node of the corresponding operating system type of the node 302 on layer 2; then, the corresponding node on layer 2 may be hooked with one or more servers; and when all the servers of a node of the node 302 on layer 2 can be specifically classified into the corresponding sub-nodes of the node, the node corresponds to no server, thus, the node is only for management; but the node still exists because it has sub-nodes.

Node 303 on layer 3: nodes on this layer are mainly classified according to the operating system version but is not limited to the operating system version shown in FIG. 4 and may change as the type change of the operating system version of the respective virtual machines in the cluster system. As shown in FIG. 4, the nodes can include a WinXP type node, a Win7 type node, an RHEL6.0 node, and a ubuntu12.04 node, similar to the nodes on layer 2, and can be hooked with no, one or more servers.

Node 304 on layer 4: nodes on this layer are classified mainly according to the similarity of the running progress type, as shown in FIG. 4, the nodes can be classified into "chrom-winword" type nodes (indicating that the nodes of this type run a chorme.exe process and a winwork.exe process, and the ratio of the two processes to the total process exceeds a preset specified threshold); the nodes on this layer are leaf nodes, and the leaf nodes are not generated until there are enough virtual machines with the same types, therefore, they may be hooked with one or more actual servers absolutely.

Figure 5:
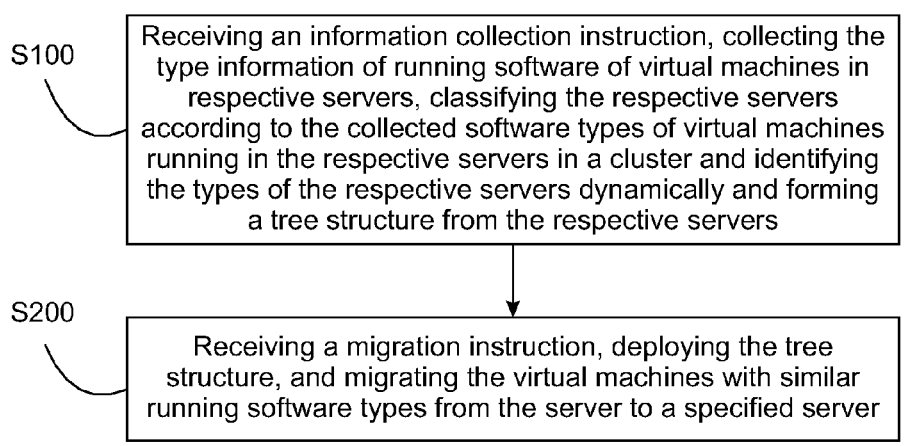
FIG. 5 is a flowchart of a method for managing excessive distribution of memory in an embodiment of the disclosure.
Figure 6:
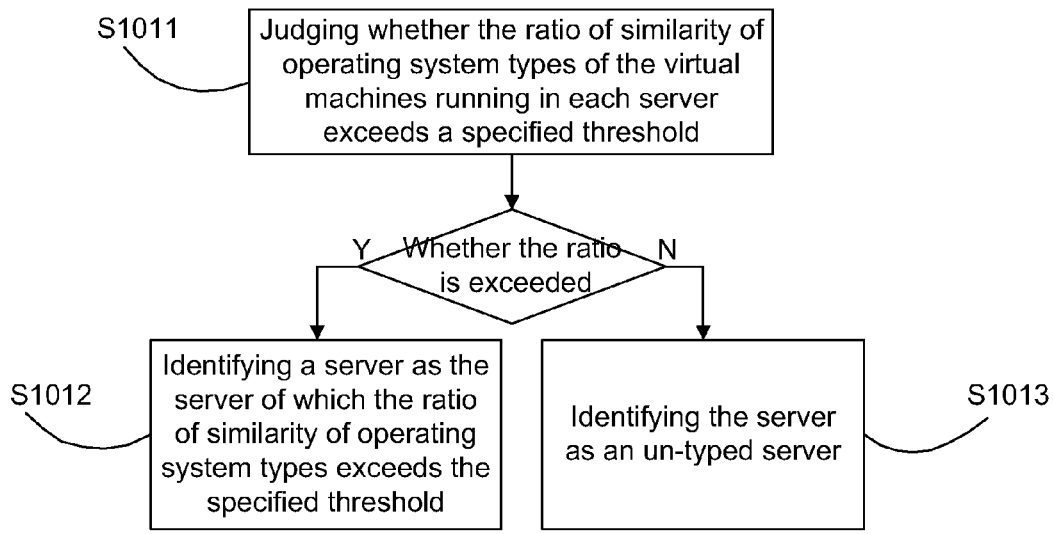
FIG. 6 is a schematic diagram showing the flow of dynamically identifying the type of a server in a first embodiment of the disclosure.

See FIGS. 4 to 5, FIG. 5 is a flowchart of a method for managing excessive distribution of memory in an embodiment of the disclosure; FIG. 6 is a flowchart of a method for managing excessive distribution of memory in another embodiment of the disclosure; FIG. 7 is a schematic diagram showing the flow of creating a virtual machine in an embodiment of the disclosure; and an embodiment of the disclosure further provides a method for managing excessive distribution of memory, including:

step 100: an information collection instruction is received, the type information of running software of virtual machines in respective servers is collected, the respective servers are classified according to the collected software types of virtual machines running in the respective servers in a cluster and the types of the respective servers are identified dynamically and a tree structure is formed from the respective servers; and step 200: a migration instruction is received, the tree structure is deployed, and the virtual machines with similar running software types are migrated from a local server to a specified server.

Furthermore, as shown in FIG. 6, which is a schematic diagram showing the flow of dynamically identifying the type of a server in a first embodiment of the disclosure, in the first embodiment shown in FIG. 6, the software type information of the virtual machine includes operating system type information. Step 1011 is executed first in which whether respective ratios of similarity of operating system types of the virtual machines running in respective servers exceed a specified threshold is judged; if a ratio exceeds the specified threshold, Step 1012 is executed in which the server corresponding to the ratio is identified as the server of which the ratio of similarity of operating system types exceeds the specified threshold; specifically, for example, one virtual machine runs the RHEL6.0 server operating system released by the redhat company, and another virtual machine runs the SUSE 10 server operating system released by the suse company, and both the two operating systems utilize Linux kernel, therefore it can be determined that the operating system types of the two virtual machines are the same; provided that the specified threshold of the ratio of similarity of the operating system types of the virtual machines is 80%, then when more than 80% of virtual machines of a server have the same operating system type, the server is identified as the server of which the ratio of similarity of operating system types exceeds the specified threshold; otherwise, Step 1013 is executed in which the server is identified as an un-typed server.

Furthermore, as shown in FIG. 7, which is a schematic diagram showing the flow of dynamically identifying the type of a server in a second embodiment of the disclosure. In the second embodiment in FIG. 7, the software type information of the virtual machines further includes operating system version information; Step 1021 is executed first in which whether the respective ratios of similarity of operating system types and respective ratios of similarity of operating system versions of virtual machines running in respective servers exceed specified thresholds is judged, if both the two kinds of ratios exceed the specified threshold, Step 1022 is executed in which a server corresponding to the two kinds of ratios is identified as the server of which the ratio of similarity of operating system versions exceeds the specified threshold; specifically, for example, one virtual machine runs a Win7 operating system released by the Microsoft company, and another virtual machine runs a Windows2008 server operating system released by the Microsoft company, it can be determined that the two virtual machines has the same operating system type but different operating system versions; moreover, provided that the specified threshold of the ratio of similarity of the operating system types of the virtual machines is 80% and the specified threshold of the ratio of similarity of the operating system versions of the virtual machines is 60%, when more than 80% of virtual machines in a server have the same operating system type, and more than 60% of the virtual machines in the server have the same operating system version, the server is identified as the server of which the ratio of similarity of operating system versions exceeds the specified threshold; and when the server does not have the ratio of similarity exceeding the threshold, Step 1011 is executed, otherwise, whether the ratio of similarity of the operating system types of the virtual machines running in the server exceeds the specified threshold is judged, and dynamic identification is carried out as shown in FIG. 6.

Figure 8:
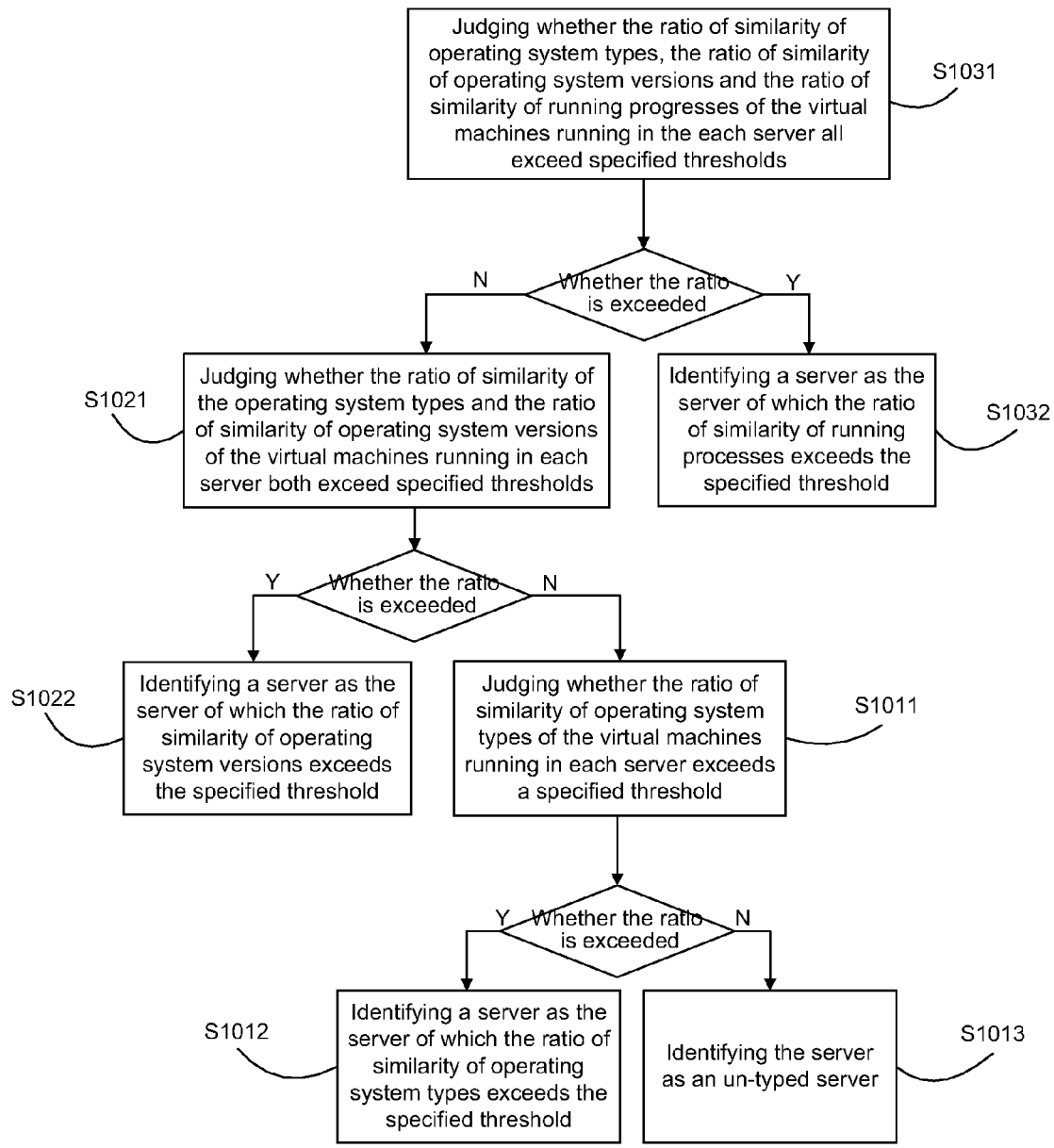
FIG. 8 is a schematic diagram showing the flow of dynamically identifying the type of a server in a third embodiment of the disclosure.

Furthermore, as shown in FIG. 8, which is a schematic diagram showing the flow of dynamically identifying the type of a server in a third embodiment of the disclosure; in the third embodiment in FIG. 8, the software type information of the virtual machines further includes running process information. Step 1031 is executed first in which whether respective ratios of similarity of operating system types, respective ratios of similarity of operating system versions and respective ratios of similarity of running progresses of virtual machines running in respective servers exceed specified thresholds is judged; if the three kinds of ratios all exceed the specified thresholds, Step 1032 is executed in which the server satisfying the three ratios is identified as the server of which the ratio of similarity of running processes exceeds the specified threshold. Specifically, for example, on the basis that the ratio of similarity of operating system types and the ratio of similarity of operating system versions both exceed the specified threshold, the running progresses with the same name are of one running process type, then, provided that a virtual machine has 10 running process types in total, another virtual machine has 12 running process types in total, the two virtual machines have 8 same running process types in total, and the specified threshold is 50%, it can be determined that the two virtual machines have same operating system type and operating system version and similar application processes; thus, the server running the two virtual machines is identified as the server of which the ratio of similarity of running processes exceeds the specified threshold; otherwise, Step 1021 is executed in which whether both the ratio of similarity of operating system types and the ratio of similarity of operating system versions of the virtual machines running in the server exceed the specified threshold is judged, and dynamic identification is carried out as shown in FIG. 7.

To sum up, in the method for managing excessive distribution of memory, the types of the servers are identified dynamically according to whether the ratio of similarity of software type information of the virtual machines in a server exceeds a specified threshold, and the server is identified dynamically according to the deepest similarity.

Figure 9:
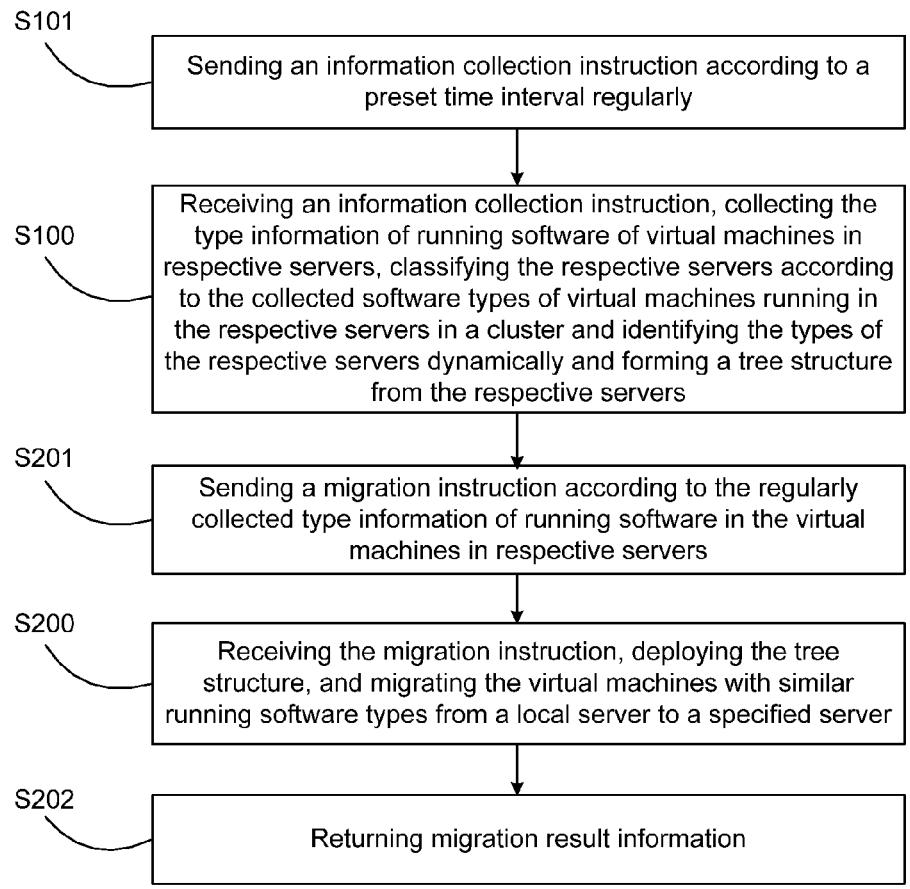
FIG. 9 is a flowchart of a method for managing excessive distribution of memory in another embodiment of the disclosure.

Furthermore, as shown in FIG. 9, which is a flowchart of a method for managing excessive distribution of memory in another embodiment of the disclosure; and before an information collection instruction is received, the method further includes Step 101 in which the information collection instruction is sent regularly according to a preset time interval.

Before a migration instruction is received, the method further includes Step 201 in which the migration instruction is sent according to the regularly collected type information of running software in the virtual machines in respective servers.

After the migration instruction is received, the tree structure is deployed, and the virtual machines with similar running software types are migrated from the server to a specified server, the method further includes Step 202 in which migration result information is returned.

Figure 10:
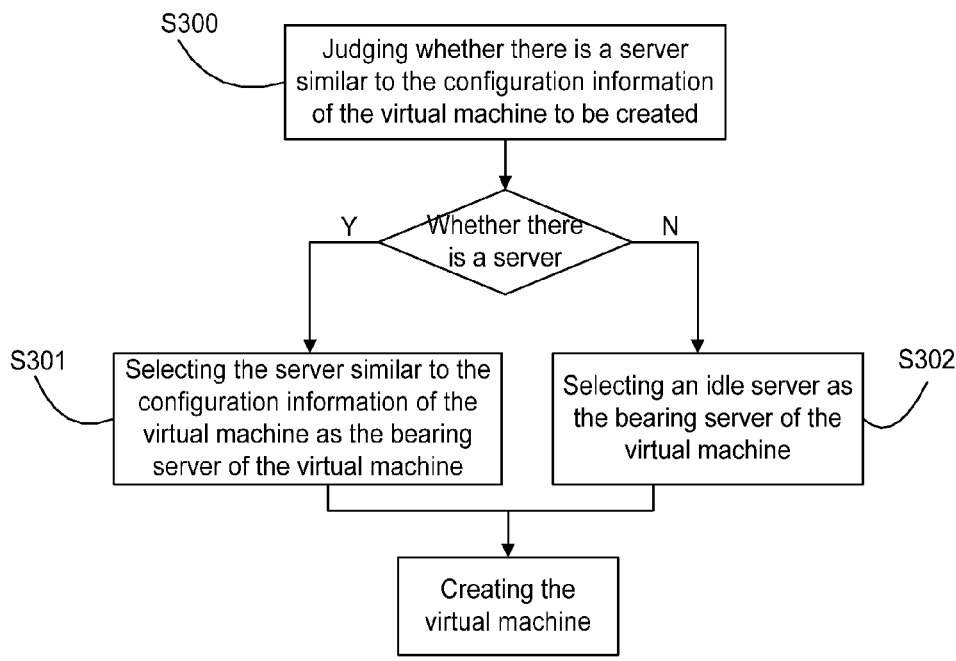
FIG. 10 is a schematic diagram showing the flow of creating a virtual machine in an embodiment of the disclosure.

Furthermore, as shown in FIG. 10, which is a schematic diagram showing the flow of creating a virtual machine in an embodiment of the disclosure. The method for managing excessive distribution of memory further includes that a virtual machine is created, wherein the creation process of the virtual machine is not limited to be before or after a step in the method for managing excessive distribution of memory, and when the virtual machine needs to be created, whether there is a server similar to the configuration information of the virtual machine to be created is judged.

if such a server exists, after the server which is similar to the configuration information of the virtual machine to be created is selected as the bearable server of the virtual machine to be created, the virtual machine is created;

otherwise, after an idle server is selected as the bearable server of the virtual machine to be created, the virtual machine is created.

Figure 11:
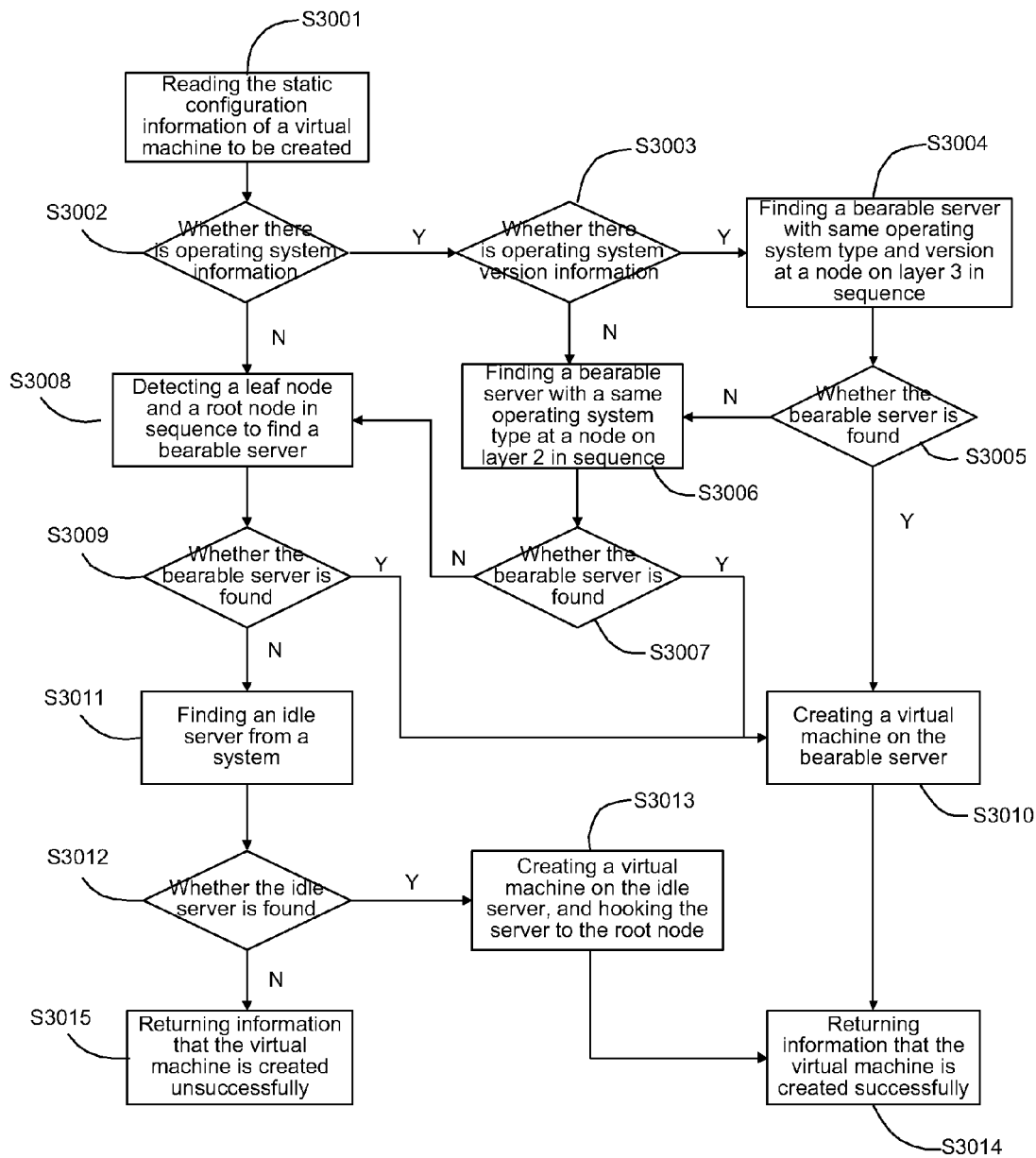
FIG. 11 is a schematic diagram showing the flow of creating a virtual machine in another embodiment of the disclosure.

Specifically, see FIG. 11, which is a schematic diagram showing the flow of creating a virtual machine in another embodiment of the disclosure. The creation process of the virtual machine is as shown in FIG. 11:

Step 3001: the static configuration information of the virtual machine to be created is read;

Step 3002: whether the operating system type information of the virtual machine exists in the static configuration information is judged, if existing, Step 3003 is executed, otherwise, Step 3008 is executed;

Step 3003: whether the operating system version information of the virtual machine exists in the static configuration information is judged, if existing, Step 3004 is executed, otherwise, Step 3006 is executed;

Step 3004: servers with the same operating system type and version are found on a node 303 on layer 3 from left to right (or in other orders), whether a server meeting this condition can further bear a virtual machine is checked, and the server is taken as a bearable server of the virtual machine to be created;

Step 3005: whether the bearable server is found is judged, if not found, Step 3006 is executed, otherwise, Step 3010 is executed;

Step 3006: servers with the same operating system type are found on a node 302 on layer 2 from left to right (or in other orders), whether a server meeting this condition can further bear a virtual machine is checked, and the server is taken as a bearable server of the virtual machine to be created;

Step 3007: whether the bearable server is found is judged, if not found, Step 3008 is executed, otherwise, Step 3010 is executed;

Step 3008: a leaf node 304 is detected first from left to right (or in other orders), a root node 301 is detected at last, and a server which can bear the virtual machine to be created is found on these nodes;

Step 3009: whether the bearable server is found on the leaf node 304 and the root node 301 is judged, if found, Step 3010 is executed, otherwise, Step 3011 is executed;

Step 3010: a new virtual machine is created on the found bearable server according to the configuration information, and then Step 3014 is executed;

Step 3011: an idle server is found from a system;

Step 3012: whether the idle server is found is judged, if found, Step 3013 is executed, otherwise, Step 3015 is executed;

Step 3013: a new virtual machine is created on the found idle server according to the configuration information, and the server is hooked to the root node 301, and then Step 3014 is executed;

Step 3014: the information that the virtual machine is created successfully is returned, and the flow is ended; and Step 3015: the information that the virtual machine is created unsuccessfully is returned, and the flow is ended.

Figure 12:
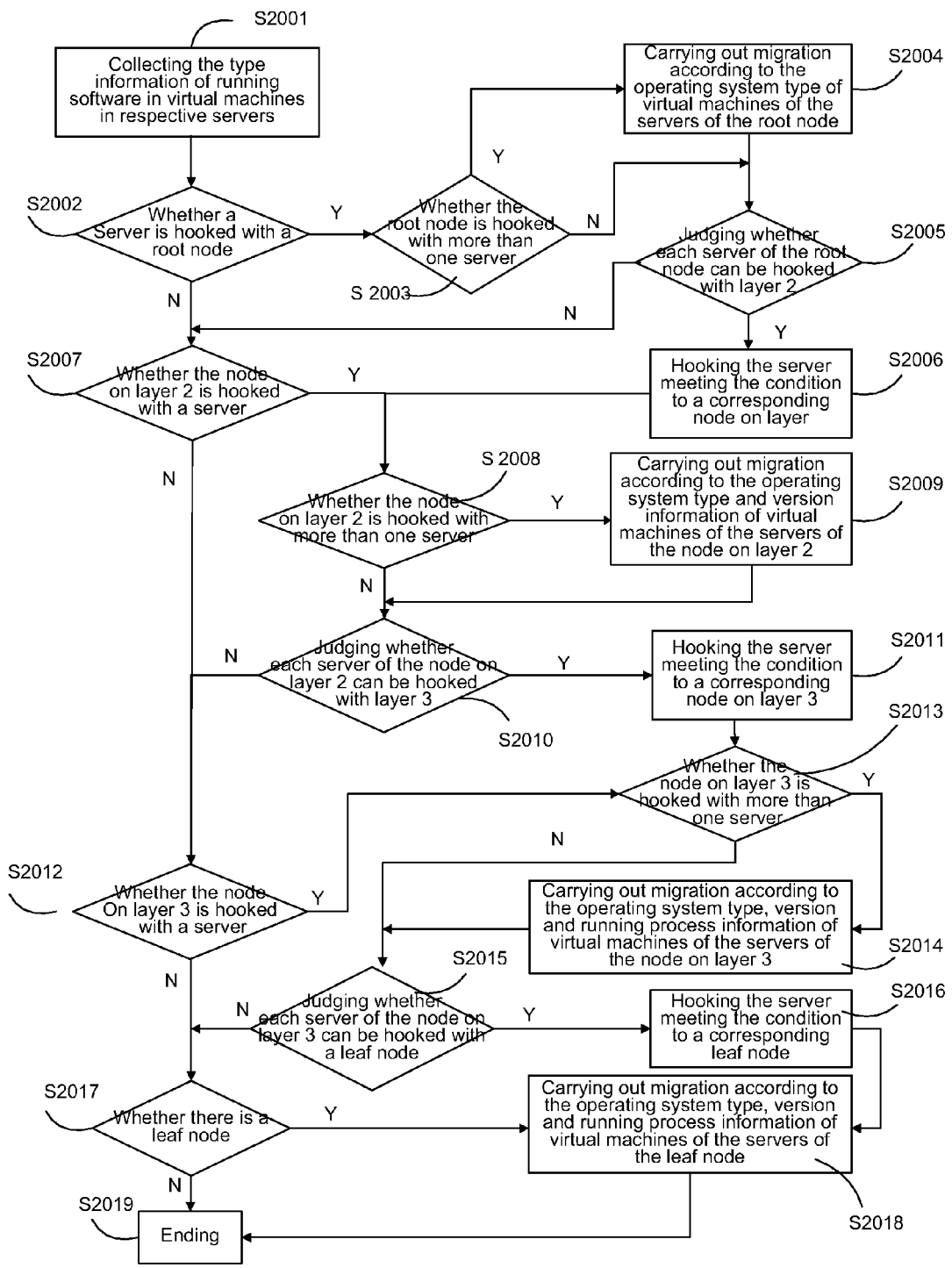
FIG. 12 is a schematic diagram showing the flow of migrating a virtual machine according to the type information of running software in an embodiment of the disclosure.

Furthermore, see FIG. 12, which is a schematic diagram showing the flow of migrating a virtual machine according to the type information of running software in an embodiment of the disclosure. The flow of migrating the virtual machine according to the type information of the running software is as shown in FIG. 12:

Step 2001: the type information of the running software in the virtual machines in respective servers is collected, and then Step 2002 is executed;

Step 2002: whether a root node 301 is hooked with a server is checked, if such a server exists, Step 2003 is executed, otherwise, Step 2007 is executed;

Step 2003: whether the root node 301 is hooked with more than one server is judged, if so, Step 2004 is executed, otherwise, Step 2005 is executed;

Step 2004: migration is carried out according to the operating system types of the virtual machines in the servers of the root node 301, and the virtual machines with the same operating system type are switched and migrated two by two among the servers; moreover, the difference between the total bearing capability of the servers and the total amount of the virtual machines is calculated, if the difference exceeds the maximal bearing capability of a server, the virtual machines in the server which bears the fewest virtual machines are migrated to other servers in an order that the virtual machines with the same operating system type are prioritized, and then Step 2005 is executed;

Step 2005: whether the servers of the root node 301 can be hooked to layer 2 is judged, namely, the proportion of the virtual machines with the same operating system type on respective servers of the current root node 301 is detected in sequence, when the ratio of similarity of the operating system types of all the virtual machines in a server exceeds a specified threshold, the server can be hooked to a node corresponding to the node 302 of layer 2. Thus, if there is a server meeting the condition, Step 2006 is executed, otherwise, Step 2007 is executed;

Step 2006: the server meeting the condition is hooked to the corresponding node 302 of layer 2, and if there is a node with the same operating system type in the node 302 of layer 2, the server can be directly hooked with the node in sequence, and if there is no node of the operating system type, a new node is created, then the server is hooked and Step 2008 is executed;

Step 2007: whether a server is hooked with the node 302 of layer 2 is checked, if such a server exists, Step 2008 is executed, otherwise, Step 2012 is executed;

Step 2008: whether more than one server is hooked with the node 302 of layer 2 is judged, if so, Step 2009 is executed, otherwise, Step 2010 is executed;

Step 2009: migration is carried out according to the operating system type and version information of the virtual machines of the servers of respective nodes 302 of layer 2; among the servers hooked with a single node 302 of layer 2, (most of the operating system types of the virtual machines of respective servers of a single node 302 of layer 2 are the same), the virtual machines are switched and migrated two by two among the servers according to the principle that the virtual machines with the same operating system type and version are combined; moreover, among the nodes 302 of the whole layer 2, the virtual machines are switched and migrated two by two among the servers according to the principle that the virtual machines with the same operating system type and version are combined; and finally, the difference between the total bearing capability of the servers on layer 2 and the total amount of the virtual machines is calculated; if the difference exceeds the maximal bearing capability of a server, the virtual machines in the server which bears the fewest virtual machines are migrated to other servers in an order that the virtual machines with the same operating system type and version are migrated firstly and the virtual machines with the same operating system type are migrated secondly, and then the server is set as an idle server; after the virtual machines are combined, the proportion of the combined virtual machines with the same operating system type of the server is detected, and if the proportion is lower than the specified threshold, the virtual machines are hooked to the root node 301 again; and after the virtual machines are hooked to the root node 301, if the previous node 302 of layer 2 has no server nor no sub-node, the node 302 of layer 2 is deleted; and then Step 2010 is executed;

Step 2010: whether the servers of the node 302 of layer 2 can be hooked to layer 3 is judged, namely, the proportion of the virtual machines with the same operating system type and version in the servers of each node 302 of layer 2 is checked in sequence; when both the ratio of similarity of operating system types and the ratio of similarity of operating system versions of all the virtual machines on a server exceed the specified threshold, the server can be hooked to a node corresponding to the node 303 of layer 3; and if there is a server meeting the condition, Step 2011 is executed, otherwise, Step 2012 is executed;

Step 2011: The server meeting the condition is hooked to the corresponding node 303 of layer 3, and if there is a node with the same operating system type and version in the node 303 of layer 3, the server can be directly hooked in sequence, and if there is no node with the same operating system type and version, a new node is created, and then the server is hooked, and Step 2013 is executed;

Step 2012: whether a server is hooked with the node 303 of layer 3 is checked, if such a server exists, Step 2013 is executed, otherwise, Step 2017 is executed;

Step 2013: whether the sum of servers hooked with the node 303 of layer 3 is more than 1 is judged, if more than 1, Step 2014 is executed, otherwise, Step 2015 is executed;

Step 2014: migration is carried out according to the operating system type, the operating system version and the running process information of the virtual machines in the servers of respective nodes 303 of layer 3; among the servers hooked with a single node 303 of layer 3, (most of the operating system types and versions of the virtual machines in respective servers of a single node 303 of layer 3 are the same), the virtual machines are switched and migrated two by two among the servers according to the principle that the virtual machines with the same operating system type and version and similar running processes are combined (when the proportion with the same running process of the virtual machines in the servers exceeds the specified threshold, the running processes are considered to be similar); then, among the nodes 303 of the whole layer 3, the virtual machines are switched and migrated two by two among the servers according to the principle that the virtual machines with the same operating system type, version and running process are combined; and finally, the difference between the total bearing capability of the servers on layer 3 and the total amount of the virtual machines is calculated, and if the difference exceeds the maximal bearing capability of a server, the virtual machines in the server which bears the fewest virtual machines are migrated to other servers in an order that the virtual machines with the same operating system type, version and running process are migrated firstly, the virtual machines with the same operating system type and version are migrated secondly and the virtual machines with the same operating system type are migrated thirdly, and then the server is set as an idle server; after the virtual machines are combined, the proportion of the combined virtual machines with the same operating system type and version of the server is detected, if the proportion is lower than the specified threshold, the virtual machines are hooked to the corresponding node 302 of layer 2 again; and after the virtual machines are hooked to the node 302 of layer 2, if the previous node 303 of layer 3 has nor server nor sub-node, the node 303 of layer 3 is deleted; and then Step 2015 is executed;

Step 2015: whether the servers of the node 303 of layer 3 can be hooked to layer 4 is judged, namely, the proportion of the virtual machines with the same operating system type and version and similar running process in the servers of layer 3 is detected in sequence; when the ratio of similarity of operating system types, versions and running processes of all the virtual machines on a server exceeds the specified threshold, the server can be hooked to a node corresponding to a leaf node 304; and if there is a server meeting the condition, Step 2016 is executed, otherwise, Step 2017 is executed;

Step 2016: a server meeting the condition is hooked to the corresponding leaf node 304; if there is a node which has the same operating system type and version and a similar running process as that of a server in the leaf node 304, the server can be directly hooked in sequence; if there is no node which has the same operating system type and version and a similar running process as that of the server, a node is created, and then the server is hooked and Step 2018 is executed;

Step 2017: whether there is a leaf node 304 is checked, if there is the leaf node, Step 2018 is executed, otherwise, Step 2019 is executed;

Step 2018: migration is carried out according to the operating system type, operating system version and running process information of the virtual machines in the servers of each leaf node 304, the difference between the total bearing capability of the servers of each leaf node 304 and the total amount of the virtual machines is calculated, and if the difference exceeds the maximal bearing capability of a server, the virtual machines in the server which bears the fewest virtual machines are migrated to other servers in an order that the virtual machines with the same operating system type and version and similar running processes are migrated firstly, the virtual machines with the same operating system type and version are migrated secondly, and the virtual machines with the same operating system type are migrated thirdly, and the server is set as an idle server; after the virtual machines are combined, the proportion of the combined virtual machines with the same operating system type and version and similar running processes in the combined virtual machines of the server is detected, if the proportion is lower than the specified threshold, the server is hooked to the corresponding node 303 of layer 3; if the corresponding previous leaf node 304 of the serve is not hooked with the server, the leaf node 304 is deleted; and Step 2019 is executed; and Step 2019: the processing flow is ended.

According to the method for managing excessive distribution of memory, based on a page sharing technology, the software types of the virtual machines running in respective servers are collected, the running virtual machines with similar software types are migrated from a server to a specified server, so the page sharing effect of the virtual machines and the excessive distribution effect of memory are better; moreover, the bearing capability of the servers in the system is further ensured not to be wasted, the memory utilization rate and resource utilization rate of the whole system are combined optimally, and the memory of the whole cluster system is distributed better. Due to the application of the embodiments of the disclosure, hardware cost can be saved obviously and the operating density of a single server virtual machine can be improved for an infrastructure service provider of cloud computing and an Internet virtual host service provider, a fewer number of servers run, the energy and operating cost are saved, less pressure is caused to the environment, the emission of carbon dioxide is reduced, and a great social effect and economic effect are achieved.

What described above are only preferred embodiments of the disclosure, and the scope of patent of the disclosure is not limited herein; and all the equivalent structure or equivalent flow change made according to the description and drawings of the disclosure is directly or indirectly applied to the technical field of other related arts and also within the scope of the patent protection of the disclosure.

What is claimed is:

1. A system for managing excessive distribution of memory, comprising:
   one or more processors;
   a memory; and
   a plurality of program modules, when, executed by the one or more processors, cause the system to perform predefined functions, the plurality of program modules further comprising:
   a cluster management module, which is configured to send an information collection instruction, collect software type information of virtual machines running in respective servers in a cluster, classify the respective servers according to the software type information of the virtual machines and dynamically identify types of the respective servers to form a tree structure of the respective servers, and configure the tree structure after sending a migration instruction, wherein the software type information of the virtual machines comprises operating system type information, operating system version information and running progress information, and the tree structure sequentially comprises four layers: un-typed servers, servers with a same operating system type, servers with a same operating system version and servers with a similar running progress; and
   a server management module, which is connected with the cluster management module and is configured to collect type information of running software in each of the virtual machines in the respective servers and report the type information to the cluster management module after receiving the information collection instruction from the cluster management module, and migrate virtual machines with similar running software types from a local server to a specified server after receiving the migration instruction from the cluster management module.

2. The system for managing excessive distribution of memory according to claim 1, wherein the server management module comprises an information collecting module and a migrating module; the information collecting module is configured to collect the type information of the running software in each of the virtual machines in the respective servers and report the type information to the cluster management module after receiving the information collection instruction from the cluster management module; and the migrating module is configured to migrate the virtual machines with similar running software types from the local server to the specified server after receiving the migration instruction from the cluster management module.

3. The system for managing excessive distribution of memory according to claim 1, wherein the cluster management module comprises a virtual machine creating module, which is configured to judge whether a server which is similar to configuration information of a virtual machine to be created exists when creating the virtual machine;
   if such a server exists, select the server which is similar to the configuration information of the virtual machine to be created as a bearable server of the virtual machine and then create the virtual machine;
   otherwise, select an idle server as the bearable server of the virtual machine and then create the virtual machine.

4. The system for managing excessive distribution of memory according to claim 1, wherein the cluster management module comprises a timing module, which is configured to send the information collection instruction to the server management module regularly according to a preset time interval; and the cluster management module is further configured to send the migration instruction according to regularly collected type information of the running software of the virtual machines in the respective servers and deploy the tree structure formed by the respective servers.

5. The system for managing excessive distribution of memory according to claim 1, wherein the migrating module is further configured to return migration result information to the cluster management module.

6. The system for managing excessive distribution of memory according to claim 1, wherein a communication channel between the cluster management module and the server management module is one of a Local Area Network (LAN) channel, an Internet channel, a serial channel, a fibre channel, a wireless channel or a Storage Area Network (SAN) channel.

7. A method for managing excessive distribution of memory, comprising:
   receiving an information collection instruction, collecting software type information of running software of virtual machines in respective servers, classifying the respective servers according to the collected software type information of the virtual machines running in the respective servers in a cluster and identifying types of the respective servers dynamically to form a tree structure of the respective servers, wherein the software type information of the virtual machines comprises operating system type information, operating system version information and running progress information, and the tree structure sequentially comprises four layers: untyped servers, servers with a same operating system type, servers with a same operating system version and servers with a similar running progress; and receiving a migration instruction, configuring the tree structure, and migrating virtual machines with similar running software types from a local server to a specified server.

8. The method for managing excessive distribution of memory according to claim 7, further comprising: creating a virtual machine, and judging whether a server which is similar to configuration information of the virtual machine to be created exists when the virtual machine is to be created;

if such a server exists, selecting the server which is similar to the configuration information of the virtual machine to be created as a bearable server of the virtual machine and then creating the virtual machine;

otherwise, selecting an idle server as the bearable server of the virtual machine and then creating the virtual machine.

9. The method for managing excessive distribution of memory according to claim 7, before the information collection instruction is received, the method further comprising: sending the information collection instruction regularly according to a preset time interval; and before the migration instruction is received, the method further comprising: sending the migration instruction according to regularly collected type information of the running software in the virtual machines in the respective servers.

10. The method for managing excessive distribution of memory according to claim 7, the method further comprising returning migration result information after the migration instruction is received, the tree structure is deployed, and the virtual machines with similar running software types are migrated from the local servers to the specified server.

11. The method for managing excessive distribution of memory according to claim 7, wherein whether respective ratios of similarity of operating system types of the virtual machines running in the respective servers exceed a specified threshold is judged;

if a ratio exceeds the specified threshold, a corresponding server is identified as a server of which the ratio of similarity of operating system types exceeds the specified threshold;

otherwise, the corresponding server is identified as untyped server.

12. The method for managing excessive distribution of memory according to claim 11, wherein whether both the respective ratios of similarity of operating system types and respective ratios of similarity of operating system versions of the virtual machines running in respective servers exceed specified thresholds is judged;

if both the two kinds of ratios exceed the specified thresholds, a corresponding server is identified as a server of which the ratio of similarity of operating system versions exceeds the specified threshold;

otherwise, whether the ratio of similarity of operating system types of virtual machines running in the corresponding server exceeds the specified threshold is judged, and dynamic identification is carried out.

13. The method for managing excessive distribution of memory according to claim 12, wherein whether the respective ratios of similarity of operating system types, and the respective ratios of similarity of operating system versions and respective ratios of similarity of running processes of the virtual machines running in the respective servers all exceed specified thresholds is judged;

if the three kinds of ratios all exceed the specified thresholds, a corresponding server is identified as a server of which the ratio of similarity of running processes exceeds the specified threshold;

otherwise, whether the ratio of similarity of operating system types and the ratio of similarity of operating system versions of virtual machines running in the corresponding server both exceed the specified thresholds is judged, and dynamic identification is carried out.

* * * * *